(12) United States Patent
Ozaki

(10) Patent No.: US 8,880,267 B2
(45) Date of Patent: Nov. 4, 2014

(54) ELECTRIC AUTOMOBILE

(75) Inventor: Takayoshi Ozaki, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 14/000,373

(22) PCT Filed: Feb. 10, 2012

(86) PCT No.: PCT/JP2012/053057
§ 371 (c)(1),
(2), (4) Date: Aug. 19, 2013

(87) PCT Pub. No.: WO2012/114898
PCT Pub. Date: Aug. 30, 2012

(65) Prior Publication Data
US 2013/0325240 A1 Dec. 5, 2013

(30) Foreign Application Priority Data
Feb. 25, 2011 (JP) .................................. 2011-039411

(51) Int. Cl.
| | | |
|---|---|---|
| B60L 9/00 | (2006.01) | |
| B60K 17/04 | (2006.01) | |
| B60L 3/00 | (2006.01) | |
| B60L 15/20 | (2006.01) | |
| F16C 19/18 | (2006.01) | |
| F16C 41/00 | (2006.01) | |
| B60L 3/12 | (2006.01) | |
| F16H 1/32 | (2006.01) | |
| B60K 7/00 | (2006.01) | |

(52) U.S. Cl.
CPC .............. B60L 15/20 (2013.01); B60K 17/046 (2013.01); B60L 3/0061 (2013.01); *F16H 2001/325* (2013.01); *B60K 2007/0038* (2013.01); *F16C 2326/02* (2013.01); *B60K 7/0007* (2013.01); *B60K 2007/0092* (2013.01); F16C 19/187 (2013.01); F16C 41/007 (2013.01); B60L 3/12 (2013.01)
USPC ........................................................... 701/22

(58) Field of Classification Search
None
See application file for complete search history.

(56) References Cited

U.S. PATENT DOCUMENTS

2010/0045220 A1* 2/2010 Yamada et al. .......... 318/400.15
2012/0323430 A1* 12/2012 Nakamura et al. .............. 701/22

FOREIGN PATENT DOCUMENTS

| JP | 2000-352332 | 12/2000 |
|---|---|---|
| JP | 2006-94669 | 4/2006 |

(Continued)

OTHER PUBLICATIONS

U.S. Appl. No. 13/985,925, filed Aug. 16, 2013, Takayoshi Ozaki, NTN Corporation.

(Continued)

*Primary Examiner* — Thomas Tarcza
*Assistant Examiner* — Adam Alharbi

(57) ABSTRACT

An electric vehicle includes an inverter unit. The inverter unit includes a torque fluctuation estimator configured to estimate, according to a predefined rule, a torque fluctuation that is inclusive of fluctuations in torque attributable to a wheel bearing unit, a motor unit or a reducer unit, based on a fluctuation in a rotational frequency as determined with a rotation sensor configured to sense a rotational frequency of a wheel or with an angle sensor for the motor unit, a fluctuation in a load acting, between a road surface and a tire, along a direction in which the vehicle travels, as determined with a load sensor, or a fluctuation in a motor current.

6 Claims, 9 Drawing Sheets

(56) References Cited

FOREIGN PATENT DOCUMENTS

| JP | 2006-258289 | 9/2006 |
|----|-------------|---------|
| JP | 2007-331718 | 12/2007 |
| JP | 2008-168790 | 7/2008 |
| JP | 2008-179277 | 8/2008 |

OTHER PUBLICATIONS

U.S. Appl. No. 14/000,364, filed Aug. 19, 2013, Takayoshi Ozaki, NTN Corporation.
U.S. Appl. No. 14/000,379, filed Aug. 19, 2013, Takayoshi Ozaki, NTN Corporation.
U.S. Appl. No. 14/000,295, filed Aug. 19, 2013, Takayoshi Ozaki, NTN Corporation.
U.S. Appl. No. 14/000,783, filed Aug. 21, 2013, Takayoshi Ozaki, NTN Corporation.
International Preliminary Report on Patentability mailed Sep. 6, 2013 in corresponding International Application No. PCT/JP2012/053057.
Japanese Office Action issued May 7, 2014 in corresponding Japanese Patent Application No. 2011-039411.

* cited by examiner

OUTBOARD SIDE ← → INBOARD SIDE

ELECTRIC AUTOMOBILE

CROSS REFERENCE TO THE RELATED APPLICATIONS

This application is a U.S. national stage application of PCT/JP2012/053057 and claims foreign priority to Japanese patent application No. 2011-039411, filed Feb. 25, 2011 in the Japanese Intellectual Property Office, the contents of both of which are incorporated herein by reference.

BACKGROUND OF THE INVENTION

1. Field of the Invention

The present invention relates to an electric vehicle, such as an in-wheel motor vehicle, that is equipped with motor(s) to drive wheels and that may be battery-powered or fuel cell-powered.

2. Description of Related Art

An electric vehicle may experience degradation in performance or malfunctions of a motor serving as a drive for the vehicle, a reducer for producing reduced rotation from the motor, and/or a wheel bearing. This can significantly affect the travel performance or travel safety. Reliability of these components is an urgent concern for an in-wheel motor drive system which, due to its smaller size, involves rapid rotation of a reducer and a motor.

To ensure such reliability, an in-wheel motor drive system has been proposed in which the temperature of components such as a wheel bearing, a reducer and a motor may be measured and monitored for overload, with features to limit a drive current in the motor or a rotational frequency of the motor according to the temperature measurements (see the Patent Document 1 listed below).

[Patent Document 1] JP Laid-open Patent Publication No. 2008-168790

SUMMARY OF THE INVENTION

Over the years of operation, a wheel bearing, a reducer and a motor in an electric vehicle may cause malfunctions or degradation in performance such as abnormal wear or failures in their power system. Reducing the level of driving of a motor according to temperature measurements such as disclosed in the Patent Document 1 listed above may provide excellent overload-responsive drive that enables optimal drive for a vehicle. Yet, a variety of factors, such as operating environment, control temperature changes. Also, newly occurred abnormalities may not immediately induce temperature changes. Hence, controls based on temperature measurements may not provide a satisfactory control that is responsive to abnormalities in a wheel bearing, a reducer and a motor.

An object of the present invention is to provide an electric vehicle which can provide drive that is responsive to abnormalities in components such as a wheel bearing, a motor and/or a reducer to enable optimal drive for the vehicle, thereby ensuring reliability of those components such as a wheel bearing, a motor and/or a reducer. The general aspects of the present invention will now be described using the reference signs in the figures showing embodiments of the present invention.

The present invention may provide an electric vehicle which includes a motor unit 6 configured to drive a wheel 2. The electric vehicle also includes an ECU 21 which is an electronic control unit configured to perform general control of the vehicle. The electric vehicle also includes an inverter unit 22. The inverter unit 22 includes an inverter 31 configured to convert a DC power from a battery unit 19 into an AC power used to drive the motor unit 6 and a motor control circuitry 29 configured to control at least the inverter 31 in accordance with control from the ECU 21. The inverter unit 22 also includes a torque fluctuation estimator 37. The torque fluctuation estimator 37 is configured to estimate, according to a predefined rule, a torque fluctuation that is inclusive of fluctuations in torque attributable to a wheel bearing unit 4, the motor unit 6 or a reducer unit 7 interposed between the motor unit 6 and the wheel 2, based on (i) a fluctuation in rotational frequency as determined with a rotation sensor 24 configured to sense a rotational frequency of the wheel or with an angle sensor 36 configured to sense a rotational angle of the motor unit 6, (ii) a fluctuation in a load acting, between a road surface and a tire, along a direction in which the vehicle travels, as determined with a load sensor 41 that is operatively associated with the wheel bearing unit 4, or (iii) a fluctuation in a motor current as determined with a current sensor 35 configured to sense a current in the motor unit 6.

In practice, whether a vehicle travels at a constant speed, or otherwise accelerates or decelerates, cyclical fluctuations with a certain frequency can be observed in the rate of revolutions (i.e., rotational frequency), such as the rate of revolutions of a wheel or the rate of revolutions of a motor. Such cyclical fluctuations define a fluctuation component superimposed on a fundamental rotational frequency. Likewise, during travel, cyclical fluctuations constantly appear in a load acting, between a road surface and a tire, along a direction in which the vehicle travels. Similarly, during travel, slight, cyclical fluctuations constantly appear in a motor current. These fluctuation components defined by the aforementioned cyclical fluctuations in the rate of revolutions, a load acting between a road surface and a tire, and a motor current are mainly induced by fluctuations in torque attributable to components such as a wheel bearing unit 4, a reducer unit 7 or a motor unit 6. For example, a wheel bearing unit 4 or a reducer unit 7 may have rotational rolling contact or sliding contact areas which have caused abnormal wear. Such areas may become the cause of considerable friction. At every revolution, such areas would cause an increase in torque, which generates fluctuation components in the rate of revolutions of a wheel, the rate of revolutions of a motor unit, a load acting along a direction in which a vehicle travels, etc., as described. The aforementioned abnormal wear may also affect a motor current.

The torque fluctuation estimator 37 is configured to estimate, according to a predefined rule, a torque fluctuation that is inclusive of fluctuations in torque attributable to a wheel bearing unit 4, a motor unit 6 or a reducer unit 7, based on a fluctuation in a rotational frequency, a fluctuation in a load acting along a direction in which a vehicle travels or a fluctuation in a motor current that may be induced in the aforementioned manner. The "predefined rule" used herein may be appropriately determined by, for example, simulations. Note that a fluctuation in a rotational frequency, a fluctuation in a load acting along a direction in which a vehicle travels or a fluctuation in a motor current may include fluctuations caused by factors other than fluctuations in torque, but are mainly caused by fluctuations in torque. Thus, factors other than fluctuations in torque are also taken into account in estimating a torque fluctuation, and this may cause increase in the number of instances of abnormalities detected. However, all of those instances may be regarded as being caused by fluctuations in torque and would pose no problem in terms of reliability.

With the configuration of a torque fluctuation estimator 37 being included in the inverter unit 22 which operates under control of the ECU 21, a control to achieve a safe drive of a motor in response to abnormalities can be initiated more quickly than with a configuration of a torque fluctuation estimator 37 being included in the ECU 21. The unit of measurement for an estimated torque fluctuation produced from the torque fluctuation estimator 37 may not be limited to unit of measurement for torque, but may be any units of measurement that can be used for representing a torque fluctuation, such as a rotational frequency. Such a torque fluctuation estimator 37 allows for providing drive that is responsive to abnormalities in components such as a wheel bearing unit 4, a motor unit 6 and/or a reducer unit 7 to enable optimal drive for a vehicle, thereby ensuring reliability of those components such as a wheel bearing unit 4, a motor unit 6 and/or a reducer unit 7.

In the present invention, preferably, the inverter unit 22 further includes an abnormalities-responsive motor drive limiter 38 configured to monitor whether the torque fluctuation estimated by the torque fluctuation estimator 37 exceeds a threshold and, if the abnormalities-responsive motor drive limiter 38 determines that the torque fluctuation exceeds the threshold, limit a motor torque command or a motor current produced from the inverter unit 22. It is highly likely that components such as a wheel bearing unit 4, a reducer unit 7, and/or a motor unit 6 have caused malfunctions, when the estimated torque fluctuation produced from the torque fluctuation estimator 37 exceeds such a threshold. In this case, limiting a motor torque command or a motor current produced from the inverter unit 22 results in increased safety. For example, limiting a motor torque command or a motor current may include reducing a predetermined proportion of the motor torque command or the motor current, or may include setting the upper limit for the motor torque command or the motor current.

In a configuration where the aforementioned abnormalities-responsive motor drive limiter 38 is provided, preferably, the inverter unit 22 further includes an abnormalities notifier 39 configured to send information indicating abnormalities to the ECU 21, if the abnormalities-responsive motor drive limiter 38 determines that the torque fluctuation exceeds the threshold. Limiting a motor torque command or a motor current with the abnormalities-responsive motor drive limiter 38 included in the inverter unit 22 may have some influence on other components of a vehicle. The ECU 21 performs general, integrated control of the vehicle. Thus, by sending information indicating abnormalities to the ECU 21 if the abnormalities-responsive motor drive limiter 38 included in the inverter unit 22 determines that the torque fluctuation exceeds the threshold, the ECU 21 can correspondingly perform an appropriate control of the vehicle in general. Also, the ECU 21 is an upper-level control unit which may send a drive command to the inverter unit 22. Thus, an urgent control performed by the inverter unit 22 may be followed by a more appropriate control of drive which is performed by the ECU 21.

In the present invention, the motor unit 6, together with the wheel bearing unit 4 and the reducer unit 7, may form an in-wheel motor drive system 8 that is partly or entirely disposed within the wheel 2. Reliability of the motor unit 6, the wheel bearing unit 4 and the reducer unit 7 is an urgent concern for such an in-wheel motor drive system 8 which, in due to its smaller size, involves rapid rotation of the motor unit 6, the wheel bearing unit 4 and the reducer unit 7. Advantageously, the provision of the torque fluctuation estimator 37 can effectively ensure such reliability.

In the present invention, the reducer unit 7 configured to produce rotation with a speed that is reduced with respect to that of rotation of the motor unit 6 may be provided, wherein the reducer unit 7 may have a reduction ratio of 6 or greater. The provision of a reducer unit having a greater reduction ratio enables the provision of a smaller motor unit 6. Abnormalities in such a smaller motor unit 6 would produce particularly undesirable effects, since the torque generated by the motor unit 6 will be amplified and transmitted to a tire by the aforementioned reducer unit having a considerable reduction ratio. However, reliability can be advantageously achieved with the present invention.

In the present invention, the reducer unit 7 configured to produce rotation with a speed that is reduced with respect to that of rotation of the motor unit 6 may be provided, wherein the reducer unit 7 may include a cycloidal reducer. A cycloidal reducer may produce smoother rotation with an excellent reduction ratio, but may also be more susceptible to undesirable effects such as local wear. However, reliability can be advantageously achieved with the present invention.

The present invention encompasses any combination of at least two features disclosed in the claims, the specification and/or the drawings. In particular, the present invention encompasses any combination of at least two claims.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, as defined by the appended claims. In the accompanying drawings, like reference numerals are used to denote like parts throughout the several views, and:

DESCRIPTION OF EMBODIMENTS

Figure 1:
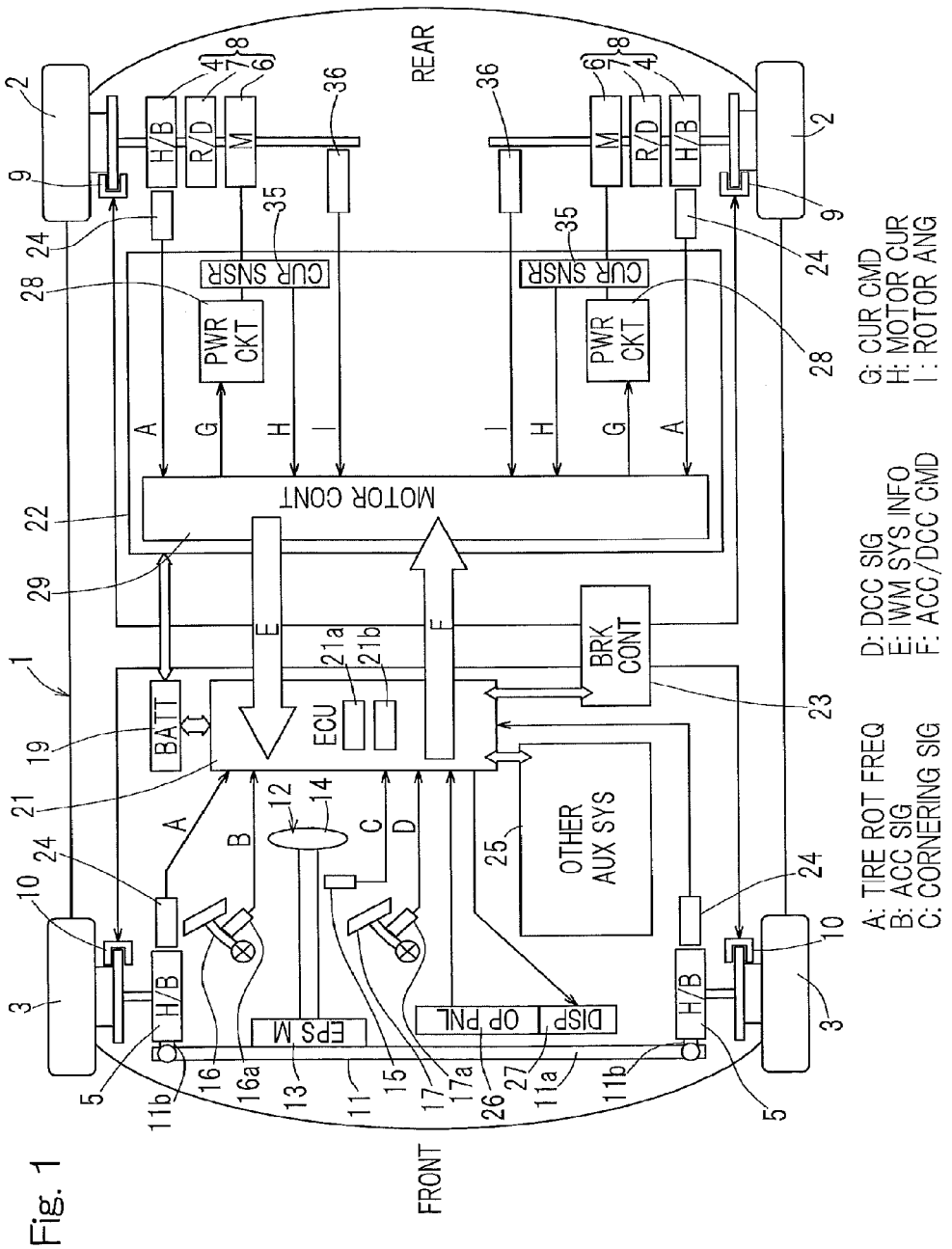
FIG. 1 is a block diagram of a schematic configuration of an electric vehicle, as viewed from top, according to an embodiment of the present invention.

One embodiment of the present invention will now be described in connection with FIG. 1 to FIG. 12. As shown in FIG. 1, the illustrated electric vehicle is a four-wheel vehicle that includes a vehicle body 1 with left and right rear wheels 2 and left and right front wheels 3, with the rear wheels 2 being drive wheels and the front wheels 3 being steered driven wheels. The drive wheels 2 and the driven wheels 3, both equipped with tires, are supported by the vehicle body 1 via respective wheel bearing units 4, 5. In FIG. 1, the wheel bearing units 4, 5 are labeled with "H/B" which is an abbreviation for hub bearing. The left and right drive wheels 2, 2 are driven by respective independent traction motor units 6, 6. Rotation of a motor unit 6 is transmitted via a reducer unit 7 and a wheel bearing unit 4 to a wheel 2. The motor unit 6, the reducer unit 7 and the wheel bearing unit 4 are integrally assembled with each other to form an in-wheel motor drive system 8 that is partly or entirely disposed within the wheel 2. The in-wheel motor drive system 8 may be referred to as an in-wheel motor unit. The motor unit 6 may, without the interposition of the reducer unit 7, directly drive the wheel 2 into rotation. The wheels 2, 3 are equipped with respective electromechanical brakes 9, 10.

The left and right front steered wheels 3, 3 are turnable via a turning mechanism 11 and are steered with a steering mechanism 12. The turning mechanism 11 includes left and right knuckle arms 11b, 11b holding the respective wheel bearing units 5 and also includes a tie rod structure 11a configured to be laterally displaced to change the angles of the left and right knuckle arms 11b, 11b. The lateral movement of the turning mechanism 11 may be caused by an EPS (Electric Power Steering) motor 13 via a rotary to linear motion converter mechanism (not shown). The steering mechanism 12 is a steer-by-wire steering system which includes a steering wheel 14 that is mechanically unconnected with the tie rod structure 11a and also includes a steering angle sensor 15 configured to sense the steering angle of the steering wheel 14, and which may send a drive signal to the EPS motor 13 according to a cornering signal indicating the sensed steering angle.

A control system will be briefly discussed. The vehicle body 1 as shown in FIG. 1 is equipped with an ECU 21 which is an electronic control unit configured to perform general control of the vehicle, an inverter unit 22 configured to perform control of the traction motor units 6, 6 according to commands from the ECU 21, and a braking controller unit 23. The ECU 21 may include a computer, programs that may be executed by the computer, and various electronic circuits.

The ECU 21 may be generally divided, in terms of their functions, into a drive control subunit 21a and a general control subunit 21b. The drive control subunit 21a is configured to generate an accelerating/decelerating command, which will influence the traction motor units 6, 6 of the left and right wheels, based on an accelerating signal produced from an accelerator manipulation unit 16, a decelerating signal produced from a brake manipulation unit 17, and a cornering signal produced from the steering angle sensor 15, and to send the accelerating/decelerating command to the inverter unit 22. In addition, the drive control subunit 21a may be configured to correct the accelerating/decelerating command, based on information indicating the rotational frequency of tire(s) produced from rotation sensor(s) 24 that is/are operatively associated with the wheel bearing units 4, 5 for the respective wheels 2, 3 and/or information produced from various sensors that may be mounted to the vehicle. The accelerator manipulation unit 16 includes an accelerator pedal and a sensor 16a configured to sense the depression of the accelerator pedal to generate the aforementioned accelerating signal. The brake manipulator unit 17 includes a brake pedal and a sensor 17a configured to sense the depression of the brake pedal to generate the aforementioned decelerating signal.

The general control subunit 21b of the ECU 21 is configured to send the decelerating command produced from the brake manipulator unit 17 to the braking controller unit 23, control various auxiliary systems 25, process input signals from an operation panel 26 on a console, cause a display 27 to show information, and/or etc. Examples of the auxiliary systems 25 include an air conditioner, a lamp, a wiper, a GPS, and an airbag. In FIG. 1, the auxiliary systems 25 are indicated in general by a single block.

The braking controller unit 23 is configured to send a braking command to the brakes 9, 10 equipped to the wheels 2, 3, according to the decelerating command received from the ECU 21. Commands related to braking produced from the ECU 21 may include, other than commands generated based on the decelerating signal produced from the brake manipulator unit 17, a command generated by a safety enhancement subunit that may be included in the ECU 21. The braking controller unit 23 may also include an anti-lock-braking system. The braking controller unit 23 may include electronic circuits and/or a microcomputer.

The inverter unit 22 includes a power circuitry 28, which may be provided one for each of the motor units 6, and a motor control circuitry 29 configured to control the power circuitry/circuitries 28. A common motor control circuitry 29 may be provided for different power circuitries 28. Independent motor control circuitries 29 may be provided for respective different power circuitries 28. Such a common motor control circuitry 29 will be configured to control the different power circuitries 28 independently of each other, for example, to achieve different motor torques. The motor control circuitry 29 may be configured to send various information related to the in-wheel motor 8 (which may be referred to as "IWM system information") held by the motor control circuitry 29, such as a variety of detected values or various control values, to the ECU.

Figure 2:
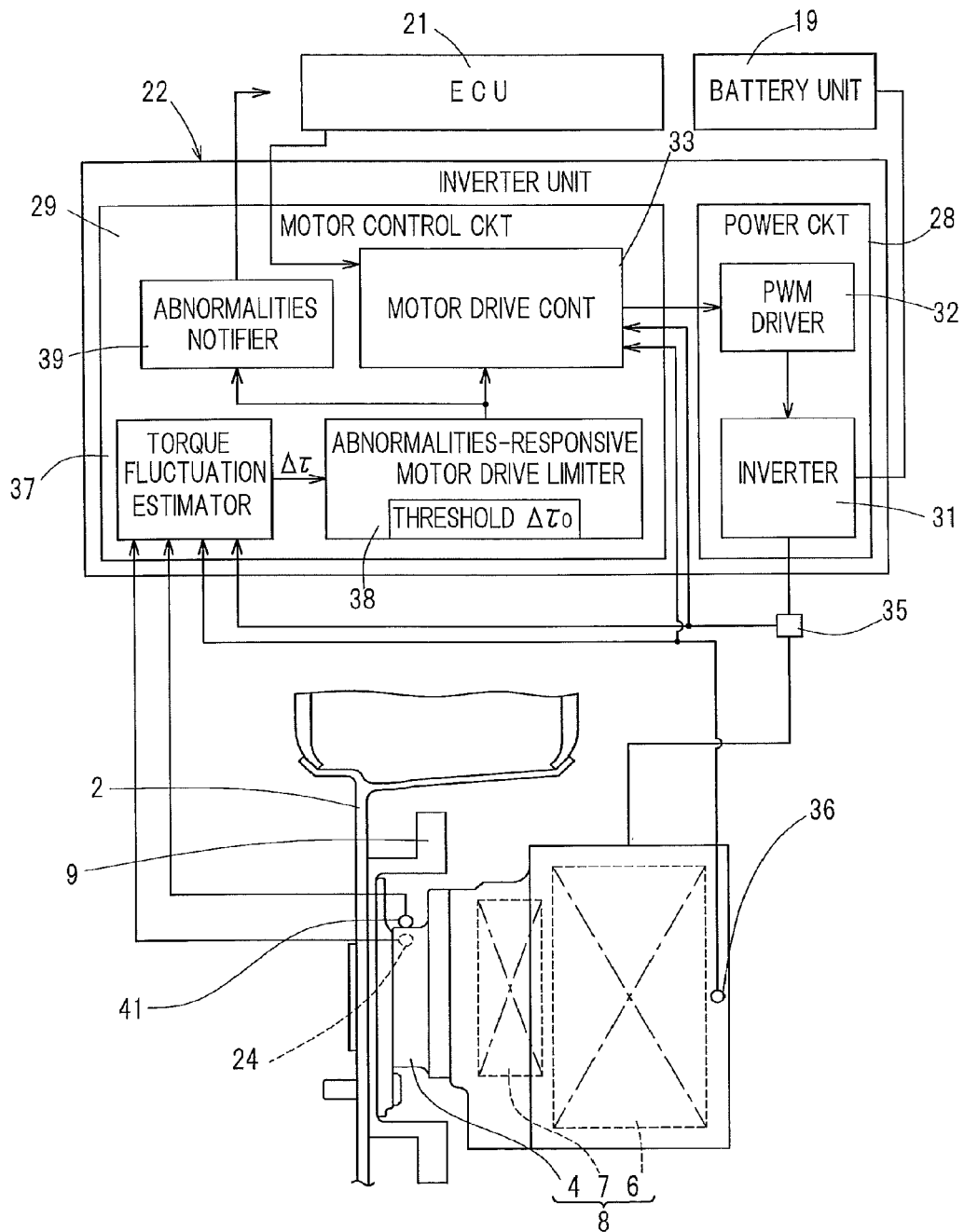
FIG. 2 is a block diagram of a schematic configuration of an inverter unit for the electric vehicle.

FIG. 2 is a block diagram of a schematic configuration of the inverter unit 22. The illustrated power circuitry 28 include an inverter 31 configured to convert a DC power from a battery unit 19 into a three-phase AC power used to drive the motor unit 6 and also include a PWM driver 32 configured to control the inverter 31. The motor unit 6 may include a three-phase synchronous motor. The inverter 31 may include a plurality of semiconductor switching devices (not shown). The PWM driver 32 may be configured to perform pulse width modulation on a received current command by generating ON/OFF commands to the semiconductor switching devices.

The motor control circuitry 29 may include a computer, programs that may be executed by the computer, and various electronic circuits. The motor control circuitry 29 may include a motor drive controller 33 which serves as a basic control component. The motor drive controller 33 may be configured to receive the accelerating/decelerating command such as a torque command from the ECU which serves as an upper-level control unit, convert the accelerating/decelerating command into a current command, and send the current command to the PWM driver 32 of the power circuitry 28. The motor drive controller 33 may be configured to obtain a motor current that flows from the inverter 31 to the motor unit 6, with a current sensor 35, and perform a current feedback control. The motor drive controller 33 may be configured to obtain a rotational angle of the motor unit 6, with an angle sensor 36, and perform a vector control.

In the embodiment under discussion, the motor control circuitry 29 may include a torque fluctuation estimator 37, an abnormalities-responsive motor drive limiter 38, and an abnormalities notifier 39, as described below.

The torque fluctuation estimator 37 may be configured to estimate, according to a predefined rule, a torque fluctuation $\Delta \tau$ that is inclusive of fluctuations in torque attributable to a wheel bearing unit 4, a motor unit 6 or a reducer unit 7, based on (i) a fluctuation in a rotational frequency as determined with the rotation sensor 24 configured to sense a rotational frequency of the wheel 2 driven by the motor unit 6 or with the angle sensor 36 configured to sense a rotational angle of the motor unit 6, (ii) a fluctuation in a load $F_x$ acting, between a road surface and a tire, along a direction in which the vehicle travels, as determined with a load sensor 41 that is operatively associated with the wheel bearing unit 4, or (iii) a fluctuation in a motor current as determined with the current sensor 35 configured to sense a current in the motor unit 6.

The abnormalities-responsive motor drive limiter 38 may be configured to monitor whether the torque fluctuation $\Delta \tau$ estimated by the torque fluctuation estimator 37 exceeds a threshold $\Delta \tau 0$ and, if the abnormalities-responsive motor drive limiter 38 determines that the torque fluctuation $\Delta \tau$ exceeds the threshold $\Delta \tau 0$, limit a motor torque command or a motor current produced from the inverter unit 22. Such a limiting procedure may include limiting, at the output of the motor drive controller 33, a current command transmitted from the motor drive controller 33 to the PWM driver 32. Such a limiting procedure may involve, within the motor drive controller 33, limiting the processing of a received motor torque command, prior to conversion into a current command.

The abnormalities notifier 39 may be configured to send information indicating abnormalities to the ECU, if the abnormalities-responsive motor drive limiter 38 determines that the torque fluctuation $\Delta \tau$ exceeds the threshold $\Delta \tau 0$.

Figure 3:
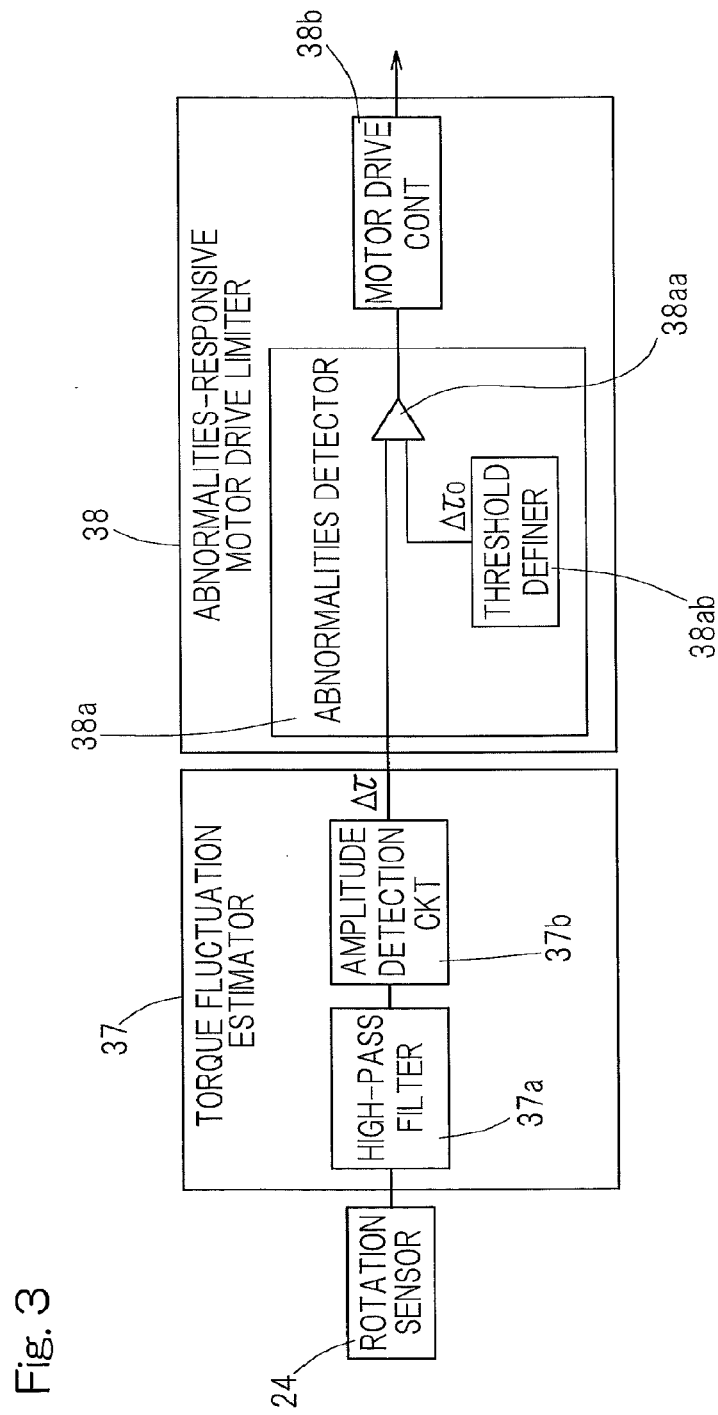
FIG. 3 is a block diagram of a torque fluctuation estimator and an abnormalities-responsive motor drive limiter that may be included in the inverter unit.

FIG. 3 shows a particular example of the torque fluctuation estimator 37 and the abnormalities-responsive motor drive limiter 38. In this example, the torque fluctuation $\Delta \tau$ is estimated based on a fluctuation in a rotational frequency as determined with the rotation sensor 24. The torque fluctuation estimator 37 may include a high-pass filter 37a that receives signals indicating a rotational frequency produced from the rotation sensor 24 and an amplitude detection circuit 37b configured to detect the amplitude of the signals indicating a rotational frequency passed through the high-pass filter 37a. The amplitude, which is detected by the amplitude detection circuit 37b, corresponds to an estimated torque fluctuation $\Delta \tau$. The cut-off frequency of the high-pass filter 37a can be appropriately selected, for example, based on the configuration of the in-wheel motor drive system 8 and/or the rotational frequency of the in-wheel motor drive system 8, and may be 10 Hz or 100 Hz.

The abnormalities-responsive motor drive limiter 38 may include an abnormalities detector 38a and a motor drive limiter 38b. The abnormalities detector 38a may include a threshold definer 38ab configured to define the threshold $\Delta \tau 0$ and may also include a comparator 38aa. The comparator 38aa may be configured to compare the torque fluctuation $\Delta \tau$ produced from the torque fluctuation estimator 37 with the threshold $\Delta \tau 0$ to determine whether the torque fluctuation $\Delta \tau$ exceeds the threshold $\Delta \tau 0$. The motor drive limiter 38b may be configured to limit a motor torque command or a motor current produced from the inverter unit 22, upon receiving a signal from the comparator 38aa indicating that the threshold $\Delta \tau 0$ has been exceeded. For example, limiting a motor torque command or a motor current may include reducing a predetermined proportion of the motor torque command or the motor current, or may include setting the upper limit for the motor torque command or the motor current.

Figure 4:
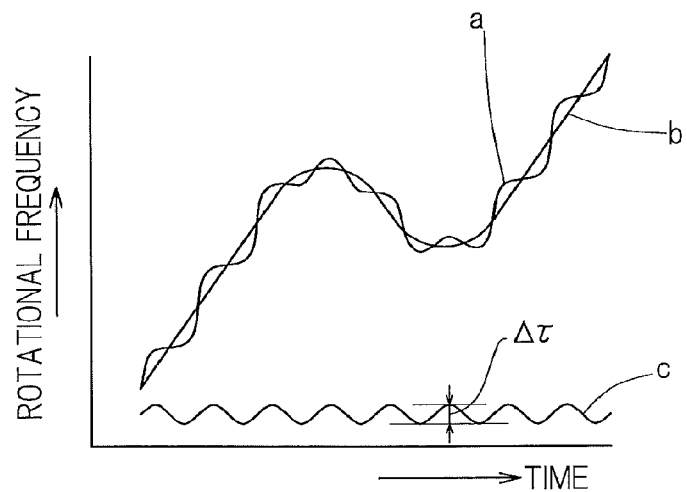
FIG. 4 is a graph illustrating an example of the fluctuation in a rotational frequency of a wheel.

The following discussion deals with how a torque fluctuation may be estimated and how a control based on the estimation may be carried out, in connection with the aforementioned configuration. In practice, whether a vehicle travels at a constant speed, or otherwise accelerates or decelerates, cyclical fluctuations with a certain frequency can be observed in the rate of revolutions (i.e., rotational frequency), such as the rate of revolutions of a wheel or the rate of revolutions of a motor. For example, actually observed rotational frequency may be depicted by a curve a such as shown in FIG. 4. The depicted curve a is composed of the curve b of a fundamental rotational frequency, superimposed with a cyclical, fluctuation component c.

Figure 5:
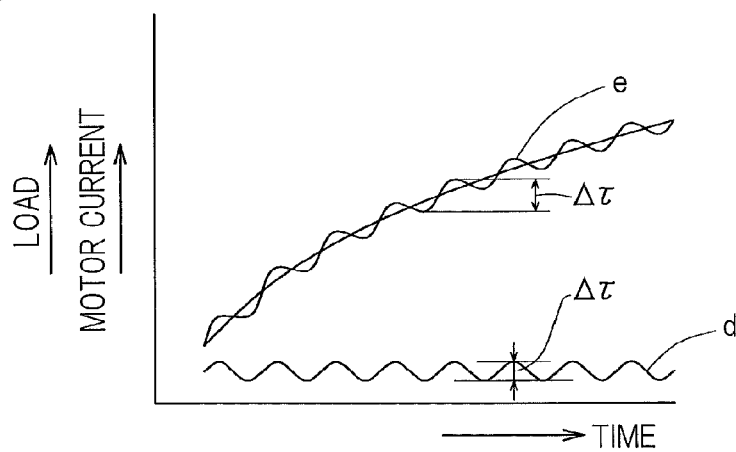
FIG. 5 is a graph illustrating an example of the fluctuation in a motor current and a load acting along a direction in which a vehicle travels.

Likewise, during travel, cyclical fluctuations constantly appear in a load acting, between a road surface and a tire, along a direction in which the vehicle travels, such as depicted by the curve d in FIG. 5. Similarly, during travel, slight, cyclical fluctuations constantly appear in a motor current, such as depicted by the curve e in the same figure.

These fluctuation components defined by the aforementioned cyclical fluctuations in a rotational frequency, a load acting between a road surface and a tire, and a motor current are mainly induced by fluctuations in torque attributable to components such as a wheel bearing unit 4, a reducer unit 7 or a motor unit 6. For example, a wheel bearing unit 4 or a reducer unit 7 may have rotational rolling contact or sliding contact areas which have caused abnormal wear. Such areas may become the cause of considerable friction. At every revolution, such areas would cause an increase in torque, which generates fluctuation components in the rate of revolutions of a wheel, the rate of revolutions of a motor unit, a load acting along a direction in which a vehicle travels, etc., as described. The aforementioned abnormal wear may also affect a motor current.

The torque fluctuation estimator 37 as shown in FIG. 2 may be configured to estimate, according to a predefined rule, a torque fluctuation $\Delta \tau$ that is inclusive of fluctuations in torque attributable to a wheel bearing unit 4, a motor unit 6 or a reducer unit 7 interposed between the motor unit 6 and the wheel 2, based on a fluctuation in a rotational frequency, a fluctuation in a load acting along a direction in which a vehicle travels or a fluctuation in a motor current that may be induced in the aforementioned manner. The "predefined rule" used herein may be appropriately determined by, for example, simulations. Note that a fluctuation in a rotational frequency, a fluctuation in a load acting along a direction in which a vehicle travels or a fluctuation in a motor current may include fluctuations caused by factors other than fluctuations in torque, but are mainly caused by fluctuations in torque. Thus, factors other than fluctuations in torque are also taken into account in estimating a torque fluctuation, and this may cause increase in the number of instances of abnormalities detected. However, all of those instances may be regarded as being caused by fluctuations in torque and would pose no problem in terms of reliability. The unit of measurement for an estimated torque fluctuation produced from the torque fluctuation estimator 37 may not be limited to unit of measurement for torque, but may be any units of measurement that can be used for representing a torque fluctuation, such as a rotational frequency.

The abnormalities-responsive motor drive limiter 38 may be configured to monitor whether the estimated torque fluctuation exceeds a threshold and, if the abnormalities-responsive motor drive limiter 38 determines that the torque fluctuation exceeds the threshold, limit a motor torque command or a motor current produced from the inverter unit 22. It is highly likely that components such as a wheel bearing unit 4, a reducer unit 7, and/or a motor unit 6 have caused malfunctions, when the estimated torque fluctuation produced from the torque fluctuation estimator 37 in the aforementioned manner exceeds such a threshold. In this case, limiting a motor torque command or a motor current produced from the inverter unit 22 results in increased safety. For example, limiting a motor torque command or a motor current may include reducing a predetermined proportion of the motor torque command or the motor current, or may include setting the upper limit for the motor torque command or the motor current.

Referring to a particular example as shown in FIG. 3, in the torque fluctuation estimator 37, signals indicating a rotational frequency produced from the rotation sensor 24 are sent to the high-pass filter 37a which may reject the curve b of the fundamental rotational frequency corresponding to lower frequencies, such as shown in FIG. 4, to extract a cyclical, fluctuation component c. The amplitude of the extracted cyclical, fluctuation component c may be detected with the amplitude detection circuit 37b. The detected amplitude corresponds to a torque fluctuation $\Delta\tau$. In the abnormalities-responsive motor drive limiter 38, the abnormalities detector 38a may compare the estimated torque fluctuation $\Delta\tau$ with the threshold $\Delta\tau0$ to determine whether the estimated torque fluctuation $\Delta\tau$ exceeds the threshold $\Delta\tau0$. The motor drive limiter 38b may limit a motor torque command or a motor current produced from the inverter unit 22, upon receiving a determination result that the threshold $\Delta\tau0$ has been exceeded.

In this way, the torque fluctuation estimator 37 and the abnormalities-responsive motor drive limiter 38 allow for providing drive that is responsive to abnormalities in components such as a wheel bearing unit 4, a motor unit 6 and/or a reducer unit 7 to enable optimal drive for a vehicle, thereby ensuring reliability of those components such as a wheel bearing unit 4, a motor unit 6 and/or a reducer unit 7. Reliability of a motor unit 6, a wheel bearing unit 4 and a reducer unit 7 is an urgent concern for an in-wheel motor drive system 8 which, due to its smaller size, has less materials used, involves rapid rotation of the motor unit 6, and etc. Advantageously, the provision of the torque fluctuation estimator 37 and the abnormalities-responsive motor drive limiter 38 can effectively ensure such reliability. In particular, the provision of a reducer unit 7 having a reduction ratio of 6 or greater or a reducer unit 7 including a cycloidal reducer enables the provision of a smaller motor unit 6. Abnormalities in such a smaller motor unit 6 would produce particularly undesirable effects, since the torque generated by the motor unit 6 will be transmitted in amplified fashion to a tire by a reducer unit of the aforementioned configuration. However, reliability can be advantageously achieved with the embodiment under discussion.

With the configuration of the torque fluctuation estimator 37 and the abnormalities-responsive motor drive limiter 38 being included in the inverter unit 22 which operates under control of the ECU 21, a control to achieve a safe drive of a motor in response to abnormalities can be initiated more quickly than with a configuration of a torque fluctuation estimator 37 and an abnormalities-responsive motor drive limiter 38 being included in the ECU 21.

The abnormalities notifier 39 may be configured to send information indicating abnormalities to the ECU 21, if the abnormalities-responsive motor drive limiter 38 determines that the torque fluctuation exceeds the threshold. Limiting a motor torque command or a motor current with the abnormalities-responsive motor drive limiter 38 included in the inverter unit 22 may have some influence on other components of a vehicle. The ECU 21 performs general, integrated control of the vehicle. Thus, by sending information indicating abnormalities to the ECU 21 if the abnormalities-responsive motor drive limiter 38 included in the inverter unit 22 determines that the torque fluctuation exceeds the threshold, the ECU 21 can correspondingly perform an appropriate control of the vehicle in general. Also, the ECU 21 is an upper-level control unit which may send a drive command to the inverter unit 22. Thus, an urgent control performed by the inverter unit 22 may be followed by a more appropriate control of drive which is performed by the ECU 21. Preferably, the ECU 21 is configured to, upon receiving notification of abnormalities from the abnormalities notifier 39, indicate a user of such abnormalities by, for example, causing the display 27 to show a presentation that indicates such abnormalities.

Figure 6:
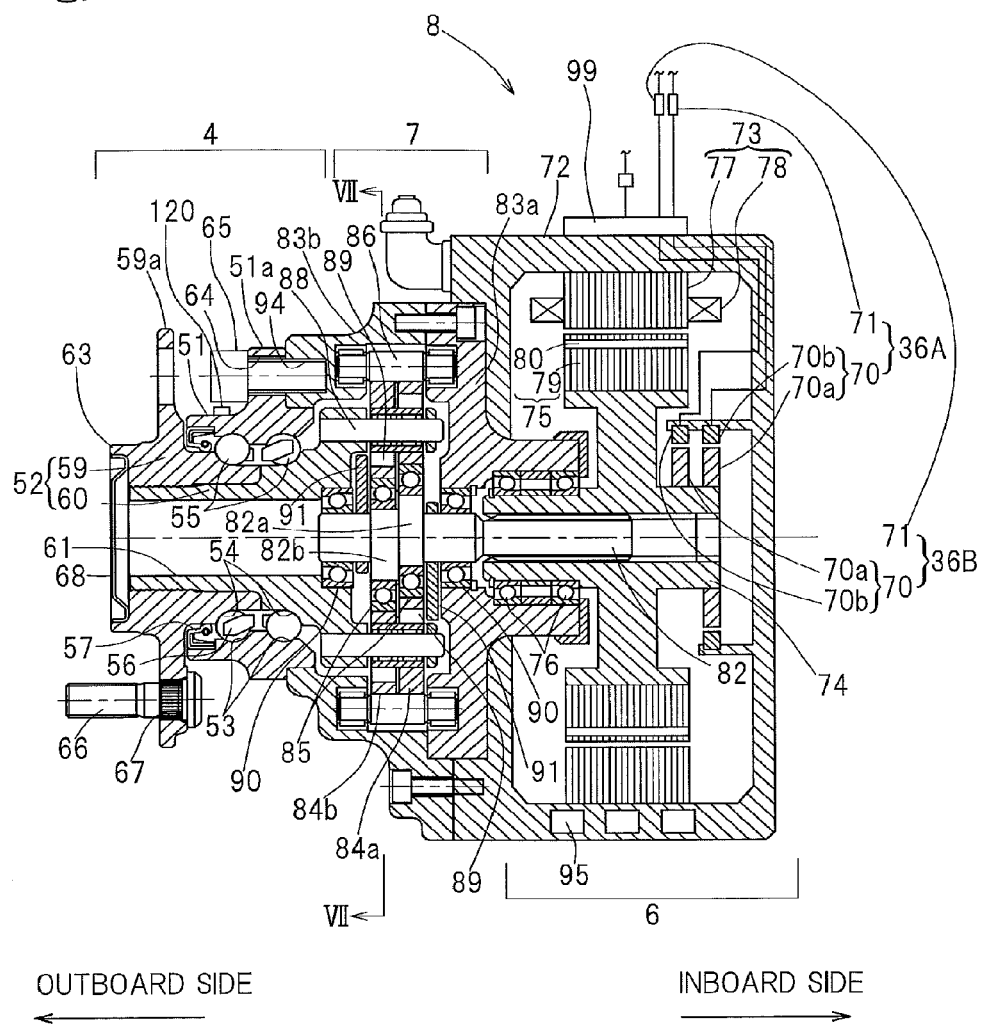
FIG. 6 is a front cut-away view of an in-wheel motor drive system for the electric vehicle.
Figure 7:
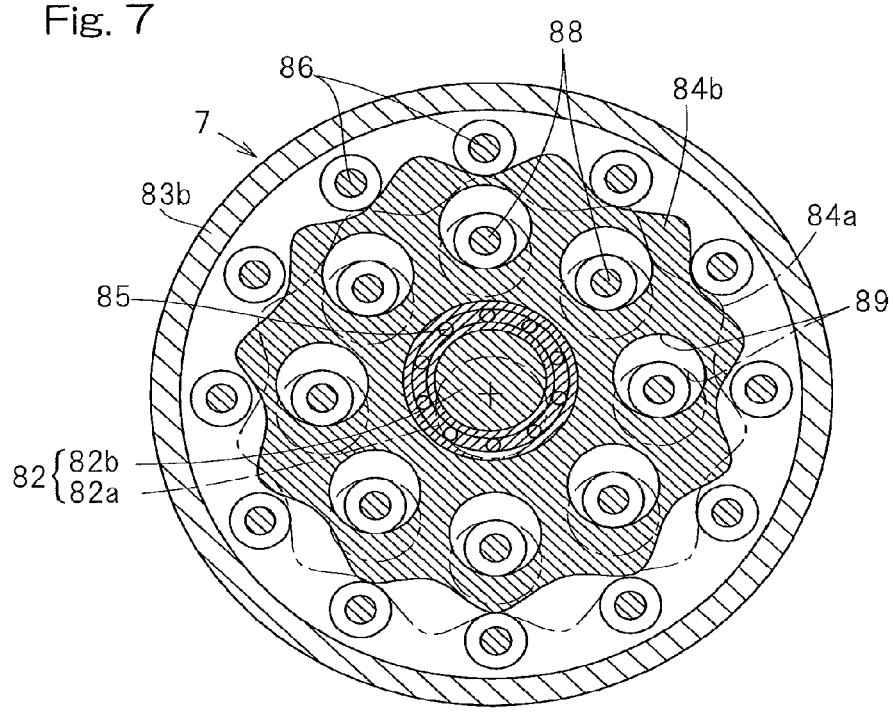
FIG. 7 is a cross sectional view of FIG. 6, taken along the line VII-VII.
Figure 8:
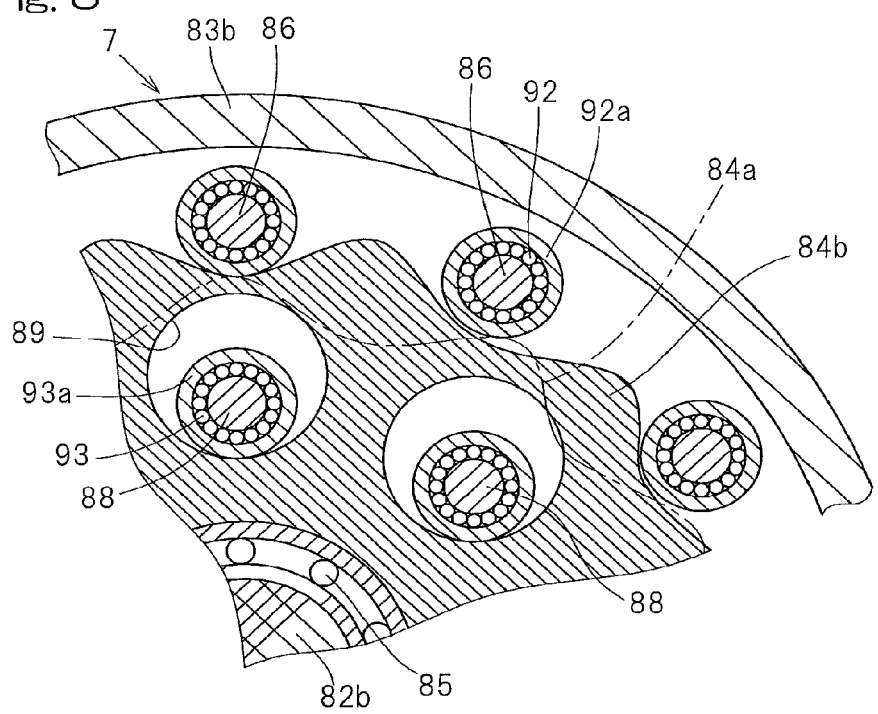
FIG. 8 is a fragmentary enlarged cross sectional view of FIG. 7.

Referring to FIG. 6 to FIG. 8, the following discussion deals with a particular example of the aforementioned in-wheel motor drive system 8. As shown in FIG. 6, the illustrated in-wheel motor drive system 8 includes a wheel bearing unit 4, a motor unit 6 and a reducer unit 7 interposed between the wheel bearing unit 4 and the motor unit 6, in which the hub of a drive wheel 2 supported by the wheel bearing unit 4 is coaxially coupled with a rotational output shaft 74 of the motor unit 6. The reducer unit 7 includes a cycloidal reducer which includes a rotational input shaft 82 coaxially connected to the rotational output shaft 74 of the motor unit 6. The rotational input shaft 82 has eccentric segments 82a, 82b. The cycloidal reducer also includes curvilinear plates 84a, 84b mounted via respective bearings 85 to the eccentric segments 82a, 82b, in such a way to transmit the eccentric motions of the curvilinear plates 84a, 84b in the form of a rotary motion to the wheel bearing unit 4. It is to be noted that hereinafter in this specification, terms "outboard" and "inboard" represent one side of the vehicle body away from the longitudinal center of the vehicle body and the other side of the vehicle body close to the longitudinal center of the vehicle body, respectively, when assembled in the vehicle body.

The wheel bearing unit 4 includes an outer member 51 having an inner periphery formed with a plurality of rows of raceway surfaces 53, an inner member 52 having an outer periphery formed with raceway surfaces 54 held in face to face relation to those raceway surfaces 53, and a plurality of rows of rolling elements 55 that are interposed between the raceway surfaces 53 of the outer member 51 and the raceway surfaces 54 of the inner member 52. The inner member 52 concurrently serves as a hub for mounting a drive wheel. The illustrated wheel bearing unit 4 includes a double row angular contact ball bearing, in which the rolling elements 55 are in the form of balls rollingly retained by a retainer 56 that is provided one for each row of the balls. The raceway surfaces 53 and 54 have arcuate cross sectional shapes and are formed to have respective contact angles held in back-to-back relation with each other. The outer member 51 and the inner member 52 define an annular bearing space therebetween, and an outboard end of the annular bearing space is sealed by a sealing member 57.

The outer member 51, which serves as a stationary member, is of one piece construction having a flange 51a for attaching to an outboard housing 83b of the reducer unit 7. The flange 51a has bolt insertion holes 64 formed at a plurality of circumferential locations thereof. The housing 83b has bolt receiving holes 94 that are internally threaded at locations thereof corresponding to the respective bolt insertion holes 64. The outer member 51 can be mounted to the housing 83b by screwing into the bolt receiving holes 94 the mounting bolts 65 that are pre-inserted in the bolt insertion holes 64.

The inner member 52, which serves as a rotational member, includes an outboard member 59 having a hub flange 59a for attaching a wheel. The inner member 52 also includes an inboard member 60 which has an outboard side fitted to an inner periphery of the outboard member 59 and which is crimped to be integrated with the outboard member 59. The outboard member 59 and the inboard member 60 have the corresponding rows of the raceway surfaces 54 formed thereon. The inboard member 60 has a center thereof formed with a through bore 61. The hub flange 59a has force-fitting holes 67 at a plurality of circumferential locations thereof for receiving corresponding hub bolts 66. The outboard member 59 has a cylindrical pilot portion 63 for guiding a drive wheel and brake components (both not shown), which is located in the vicinity of the root of the hub flange 59a of the outboard member 59 and is protruding towards the outboard side. A cap 68 closing an outboard end of the through bore 61 is fitted to an inner periphery of the pilot portion 63.

The illustrated reducer unit 7 includes a cycloidal reducer as described. As shown in FIG. 7, the cycloidal reducer includes two curvilinear plates 84a, 84b, each having an outer contour defined by a smoothly corrugated trochoidal curve that are mounted via respective bearings 85 to the eccentric segments 82a, 82b of the rotational input shaft 82. A plurality of outer pins 86 are fitted to the housing 83b to directly or indirectly guide, along the outer peripheries thereof, the eccentric motions of the curvilinear plates 84a and 84b. A plurality of inner pins 88, which are fitted to the inboard member 60 of the inner member 52, are inserted to a plurality of corresponding, round through holes 89 formed in each of the curvilinear plates 84a and 84b, to directly or indirectly engage with the through holes 89. The rotational input shaft 82 is splinedly connected to the rotational output shaft 74 of the motor unit 6 for co-rotation. As shown in FIG. 6, the rotational input shaft 82 is supported on both sides thereof, via two bearings 90, by an inboard housing 83a and by an inner diameter surface of the inboard member 60 of the inner member 52, respectively.

Rotation of the rotational output shaft 74 of the motor unit 6 causes the curvilinear plates 84a, 84b, associated with the rotational input shaft 82 that co-rotates with the rotational output shaft 74, to make eccentric motions. The eccentric motions of the curvilinear plates 84a, 84b are, through the inner pins 88 directly or indirectly engaging with the through holes 89, transmitted in the form of a rotary motion to the inner member 52. The speed of rotation of the inner member 52 is reduced with respect to that of rotation of the rotational output shaft 74. For example, a single-stage reducer unit having such a configuration can achieve a reduction ratio of 10 or greater.

The two curvilinear plates 84a, 84b are mounted, 180° out of phase with each other, to the eccentric segments 82a and 82b of the rotational input shaft 82, so that the eccentricity of the motions of the curvilinear plates 84a, 84b can be cancelled. Counterweights 91 associated with the respective eccentric segments 82a, 82b, are each disposed at a side of the corresponding one of the eccentric segments 82a, 82b, in such a way that the counterweights 91 face each other across the eccentric segments 82a, 82b while each of the counterweights 91 being displaced in a direction opposite to the direction of displacement of the corresponding one of the eccentric segments 82a, 82b. In this way, vibrations that may be caused by the curvilinear plates 84a, 84b can be cancelled out.

As shown on an enlarged scale in FIG. 8, bearings 92 and bearings 93 may be fitted to the outer pins 86 and the inner pins 88, respectively. The outer rings 92a of the bearings 92 are in rolling contact with the outer peripheries of the curvilinear plates 84a, 84b, while the outer rings 93a of the bearings 93 are in rolling contact with the inner peripheries of the through holes 89. This can minimize the contact friction between the outer pins 86 and the outer peripheries of the curvilinear plates 84a, 84b and the contact friction between the inner pins 88 and the inner peripheries of the through holes 89, thus allowing for smoother transmission of the eccentric motions of the curvilinear plates 84a, 84b in the form of a rotary motion to the inner member 52.

The motor unit 6 as shown in FIG. 6 includes a radial-gap type, IPM motor that includes a motor stator 73 fitted to a cylindrical motor housing 72 and also includes a motor rotor 75 mounted to the rotational output shaft 74, with a radial gap provided between the motor stator 73 and the motor rotor 75. The rotational output shaft 74 is cantilevered via two bearings 76 to a cylindrical segment of the inboard housing 83a of the reducer unit 7. Coolant fluid channel(s) 95 is/are formed in a peripheral wall of the motor housing 72. The flow of a lubricant or a water-soluble coolant in the coolant fluid channel(s) 95 can cool the motor stator 73.

The motor stator 73 includes a stator core body 77 made of soft magnetic material and also includes coils 78. An outer peripheral surface of the stator core body 77 is fitted to the inner peripheral surface of the motor housing 72. In this way, the stator core body 77 is supported by the motor housing 72. The motor rotor 75 includes a rotor core body 79 mounted onto the rotational output shaft 74 to be coaxial with the motor stator 73 and also includes a plurality of permanent magnets 80 incorporated in the rotor core body 79.

The motor unit 6 may be associated with a plurality of angle sensor devices 36A, 36B (in the illustrated example, two angle sensor devices) configured to sense a rotational angle of the motor rotor 75 relative to the motor stator 73. These angle sensor devices 36A, 36B correspond to an angle sensor 36 such as shown in FIG. 1 and FIG. 2. Each of the angle sensor devices 36A, 36B includes an angle sensor device body 70 configured to sense signals representing a rotational angle of the motor rotor 75 relative to the motor stator 73 for output and also includes an angle calculation circuit 71 configured to calculate a rotational angle based on the signals produced from the angle sensor device body 70. The angle sensor device body 70 includes a detectable element 70a associated with the outer peripheral surface of the rotational output shaft 74 and also includes a detector element 70b associated with the motor housing 72. For example, the detector element 70b may be positioned adjacent the detectable element 70a in a radially opposed fashion.

The detectable element 70a and the detector element 70b may be positioned adjacent each other in an axially opposed fashion. In the illustrated example, different types of sensor devices are used for the angle sensor devices 36A, 36B. For example, the angle sensor device 36A may include a magnetic encoder as the detectable element 70a of the angle sensor device body 70, while the other angle sensor device 36B may include a resolver as the detectable element 70a of the angle sensor device body 70. Control of the rotation of the motor unit 6 may be carried out by the aforementioned motor control circuitry 29 (e.g., see FIG. 1 and FIG. 2). To maximize the efficiency of the illustrated motor unit 6, the motor drive controller 33 of the motor control circuitry 29 may be configured to control the timings at which respective phase alternating currents are supplied to the coils 78 of the motor stator 73, based on the rotational angle of the motor rotor 75 relative to the motor stator 73 as sensed by the angle sensor devices 36A and/or 36B. A connector 99 may be formed at the motor housing 72 for connection of the wires for a motor current in the in-wheel motor drive system 8, wires for various sensors, wires for various commands, and etc.

Figure 9:
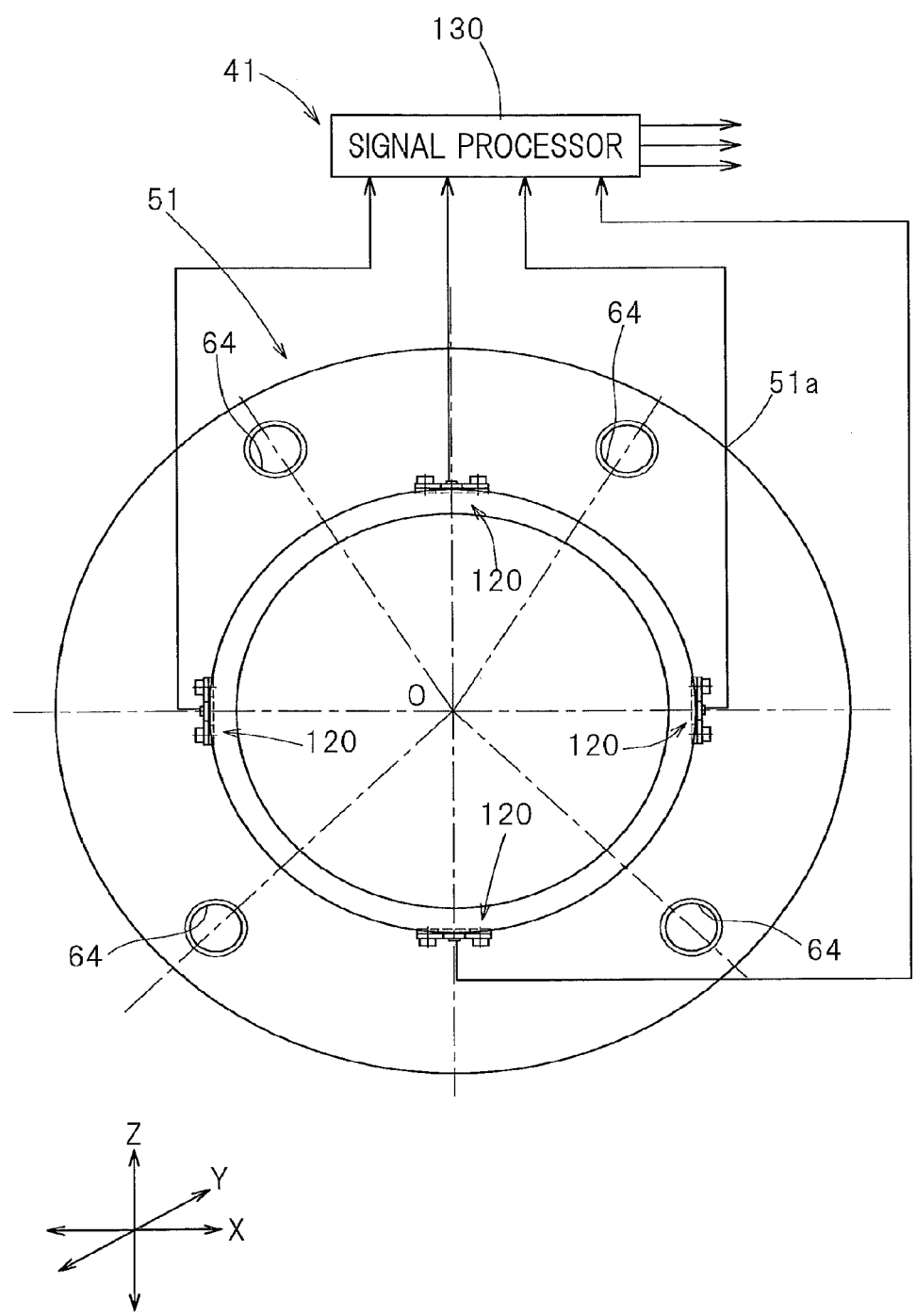
FIG. 9 shows a side view of an outer member of a wheel bearing unit of the electric vehicle, as illustrated in combination with a signal processor unit for load determination.

The aforementioned load sensor 41 as shown in FIG. 2 may include a plurality of sensor units 120 such as shown in FIG. 9, which illustrates a front view of the outer member 51 as viewed from an outboard side and may also include a signal processor unit 130 configured to process output signals of the sensor units 120. The sensor units 120 may be provided at four locations of an outer diameter surface of the outer member 51 which serves as a stationary member of the wheel bearing unit 4. In the illustrated example, the sensor units 120 are positioned at upper, lower, right and left parts, respectively, of the outer diameter surface of the outer member 51, with the upper and lower parts corresponding to vertical regions relative to a tire in contact with a road surface and the right and left parts corresponding to horizontal regions relative to a tire in contact with a road surface. The signal processor unit 130 may be disposed on or at the outer member 51, or may be included in the motor control circuitry 29 of the inverter unit 22.

The signal processor unit 130 may be configured to compare the outputs of the sensor units 120 provided at four locations and determine, according to predefined equation(s), the respective load components applied to the wheel bearing unit 4—in particular, a vertical load component $F_z$ that acts between a road surface and a tire equipped to the wheel 2, a load component $F_x$ that acts along a direction in which the vehicle travels and that may include a drive force and/or a brake force, and/or an axial load component $F_y$, for output. Such a configuration where the four sensor units 120 are evenly disposed on upper, lower, right and left parts, respectively, of an outer diameter surface of the outer member 51 such that the four sensor units are positioned to be circumferentially 90° out of phase from each other, with the upper and lower parts corresponding to vertical regions relative to a tire in contact with a road surface and the right and left parts corresponding to horizontal regions relative to a tire in contact with a road surface, allows for more accurate estimation of a vertical load component $F_z$, a load component $F_x$ that acts along a direction in which a vehicle travels, and/or an axial load component $F_y$, which may be applied to the wheel bearing unit 4.

A vertical load component $F_z$ may be determined based on comparison between the outputs of the upper and lower sensor units 120. A load component $F_x$ that acts along a direction in which a vehicle travels may be determined based on comparison between the outputs of the rear and front sensor units 120. An axial load component $F_y$ may be determined based on comparison between the outputs of the four sensor units 120. The equation(s) and/or parameter(s) that may be used in determination of the load components $F_x$, $F_y$, $F_z$ may be defined based on data values obtained by experiments and/or simulations, to achieve more precise determination of the load component(s). Note that the aforementioned determination may include correction operation(s), which will not be discussed for the purpose of simplicity.

Figure 10:
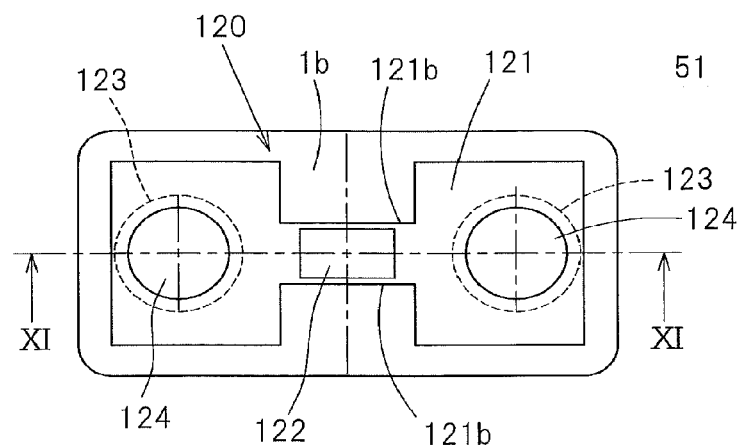
FIG. 10 is an enlarged plan view of a sensor unit for the electric vehicle.
Figure 11:
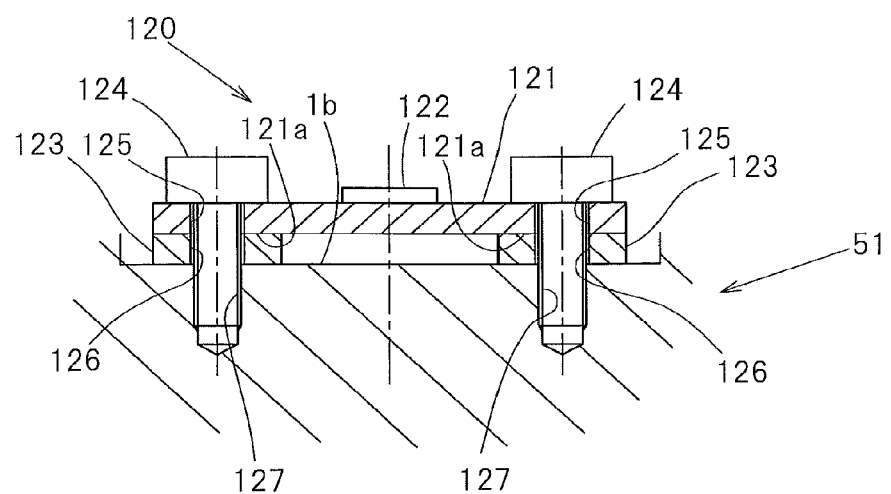
FIG. 11 is a longitudinal cross sectional view of the sensor unit.

As shown in an enlarged plan view of FIG. 10 and an enlarged cross sectional view of FIG. 11, each of the sensor units 120 may include a strain generator member 121 and a strain sensor 122 mounted on the strain generator member 121 to sense strain in the strain generator member 121. The strain generator member 121 may comprise a metal plate, such as a steel plate, that has a thickness of 3 mm or smaller and that is elastically deformable, with the metal plate having a shape of a strip having a generally uniform width along its length as viewed on a plan view while also having cutouts 121*b* being formed at a center thereof on opposite sides. The strain generator member 121 may include, at opposite ends, two fixation contact segments 121*a* that are fixedly in contact through respective spacers 123 with an outer diameter surface of the outer member 51. The strain sensor 122 may be affixed on the strain generator member 121 at a location where a larger strain occurs in response to application of load components of various directions. In the illustrated example, the strain sensor 122 is placed on an outer face of the strain generator member 121 so as to be positioned at a center of the strain generator member 121 where the strain sensor 122 is positioned between the cutouts 121*b* formed on opposite sides of the strain generator member 121. In this way, the strain sensor 122 can sense strain in the strain generator member 121 in the vicinity of the cutouts 121*b* along a circumferential direction of the strain generator member 121.

The sensor units 120 may be located with respect to the outer member 51 such that the two fixation contact segments 121*a* of a strain generator member 121 are circumferentially spaced from each other and are positioned on respective axial locations on a common plane, with the fixation contact segments 121*a* being fixedly associated through respective spacers 123, with corresponding bolts 124, to an outer diameter surface of the outer member 51. The bolts 124 are inserted into bolt insertion radial through holes 125 formed in the respective fixation contact segments 121*a*, are passed through bolt insertion holes 126 formed in the spacers 123, and are screwed into threaded holes 127 formed in an outer periphery of the outer member 51.

With such a configuration of fixedly associating the fixation contact segments 121*a* through respective spacers 123 to an outer diameter surface of the outer member 51, a center of the thin-plate, strain generator member 121 where the cutouts 121*b* are formed can be physically separated from an outer diameter surface of the outer member 51, thus facilitating straining deformation of the strain generator member 121 in the vicinity of the cutouts 121*b*. In the illustrated example, the fixation contact segments 121*a* are positioned on respective axial locations which are in the vicinity of an outboard row of raceway surfaces 53 of the outer member 51. The vicinity of an outboard row of raceway surfaces 53 of the outer member 51 used herein refers to a range extending from the center between an inboard row of raceways surfaces 53 and an outboard row of raceway surfaces 53 to the area where the outboard row of raceway surfaces 53 is formed. The outer diameter surface of the outer member 51 may include a flat segment 1*b* with which the spacers 123 are fixedly in contact.

Various types of the strain sensor 122 may be used. For example, the stain sensor 122 may include a metal foil strain gauge. In this case, the strain sensor 122 is typically glued and fixed to the strain generator member 121. The strain sensor 122 may include a thick film resistor on the strain generator member 121.

Figure 12:
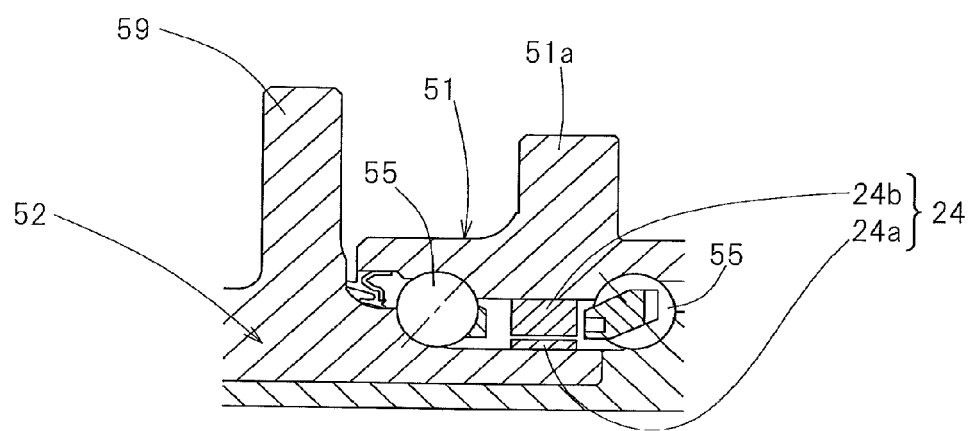
FIG. 12 is a longitudinal cross sectional view of an example of a rotation sensor for the electric vehicle.

FIG. 12 illustrates an example of a rotation sensor 24 such as shown in FIG. 1 and FIG. 2. The illustrated rotation sensor 24 includes a magnetic encoder 24*a* associated with an outer periphery of the inner member 52 of the wheel bearing unit 4 and also includes a magnetic sensor 24*b* associated with the outer member 51 in face-to-face relation with the magnetic encoder 24*a*. The magnetic encoder 24*a* may include a ring-shaped member magnetized with N poles and S poles that alternate with each other along a circumferential direction of the ring-shaped member. In the illustrated example, the rotation sensor 24 is positioned between the double rows of rolling elements 55, 55. In other embodiments, the rotation sensor 24 may be positioned at an end of the wheel bearing unit 4.

Although the present invention has been described in connection with preferred embodiments with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE SIGNS

1: Vehicle body
2, 3: Wheel
4, 5: Wheel bearing unit
6: Motor unit
7: Reducer unit
8: In-wheel motor drive system
9, 10: Electromechanical brake
11: Turning mechanism
12: Steering mechanism
19: Battery unit
21: ECU
22: Inverter unit
24: Rotation sensor
28: Power circuitry
29: Motor control circuitry
31: Inverter
32: PWM driver
33: Motor drive controller
35: Current sensor
36: Angle sensor
37: Torque fluctuation estimator
38: Abnormalities-responsive motor drive limiter
39: Abnormalities notifier
41: Load sensor

What is claimed is:

1. An electric vehicle comprising:
   a motor unit configured to drive a wheel;
   an ECU which is an electronic control unit configured to perform general control of the vehicle; and
   an inverter unit, the inverter unit including:
      a power circuitry including an inverter configured to convert a DC power from a battery unit into an AC power used to drive the motor unit;
      a motor control circuitry configured to control at least the power circuitry in accordance with control from the ECU;
      a torque fluctuation estimator configured to estimate, according to a predefined rule, a torque fluctuation that is inclusive of fluctuations in torque attributable to a wheel bearing unit, the motor unit or a reducer unit interposed between the motor unit and the wheel, based on (i) a fluctuation in a rotational frequency as determined with a rotation sensor configured to sense a rotational frequency of the wheel or with an angle sensor configured to sense a rotational angle of the motor unit, (ii) a fluctuation in a load acting, between a road surface and a tire, along a direction in which the vehicle travels, as determined with a load sensor that is operatively associated with the wheel bearing unit, or (iii) a fluctuation in a motor current as determined with a current sensor configured to sense a current in the motor unit; and
      an abnormalities-responsive motor drive limiter configured, upon receiving a determination result from the torque fluctuation estimator, to limit a motor torque command or a motor current produced from the inverter unit.

2. The electric vehicle as claimed in claim 1, wherein the abnormalities-responsive motor drive limiter configured to monitor whether the torque fluctuation estimated by the torque fluctuation estimator exceeds a threshold and, if the abnormalities-responsive motor drive limiter determines that the torque fluctuation exceeds the threshold, limit a motor torque command or a motor current produced from the inverter unit.

3. The electric vehicle as claimed in claim 2, wherein the inverter unit further includes an abnormalities notifier configured to send information indicating abnormalities to the ECU, if the abnormalities-responsive motor drive limiter determines that the torque fluctuation exceeds the threshold.

4. The electric vehicle as claimed in claim 1, wherein the motor unit, together with the wheel bearing unit and the reducer unit, forms an in-wheel motor drive system that is partly or entirely disposed within the wheel.

5. The electric vehicle as claimed in claim 1, further comprising:
   the reducer unit configured to produce rotation with a speed that is reduced with respect to that of rotation of the motor unit,
   wherein the reducer unit has a reduction ratio of 6 or greater.

6. The electric vehicle as claimed in claim 1, further comprising:
   the reducer unit configured to produce rotation with a speed that is reduced with respect to that of rotation of the motor unit,
   wherein the reducer unit comprises a cycloidal reducer.

* * * * *